No. 785,097. PATENTED MAR. 21, 1905.
J. R. HAMILTON.
MECHANICAL CALCULATOR.
APPLICATION FILED AUG. 28, 1903.
11 SHEETS—SHEET 1.
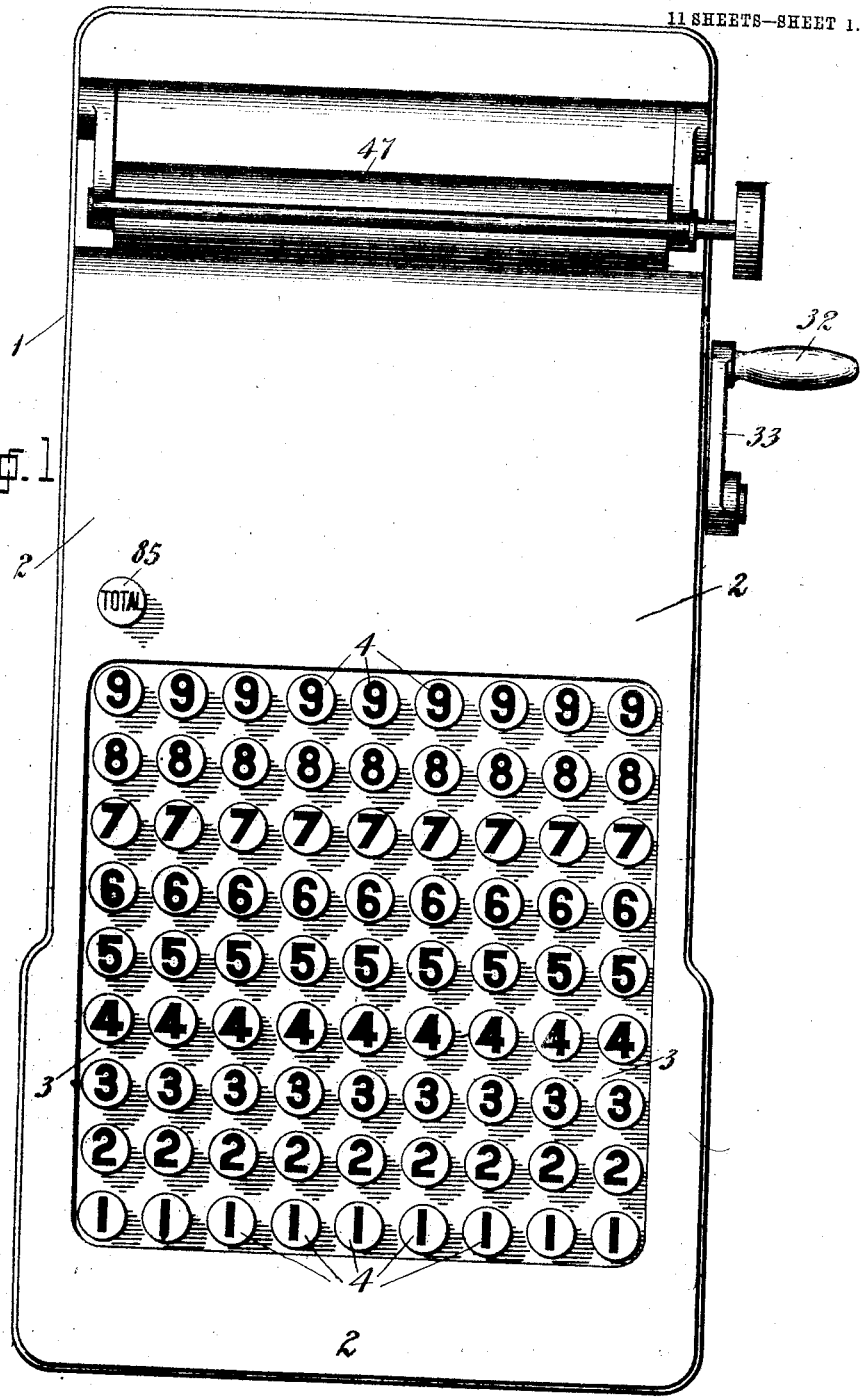

No. 785,097. PATENTED MAR. 21, 1905.
J. R. HAMILTON.
MECHANICAL CALCULATOR.
APPLICATION FILED AUG. 28, 1903.
11 SHEETS—SHEET 2.
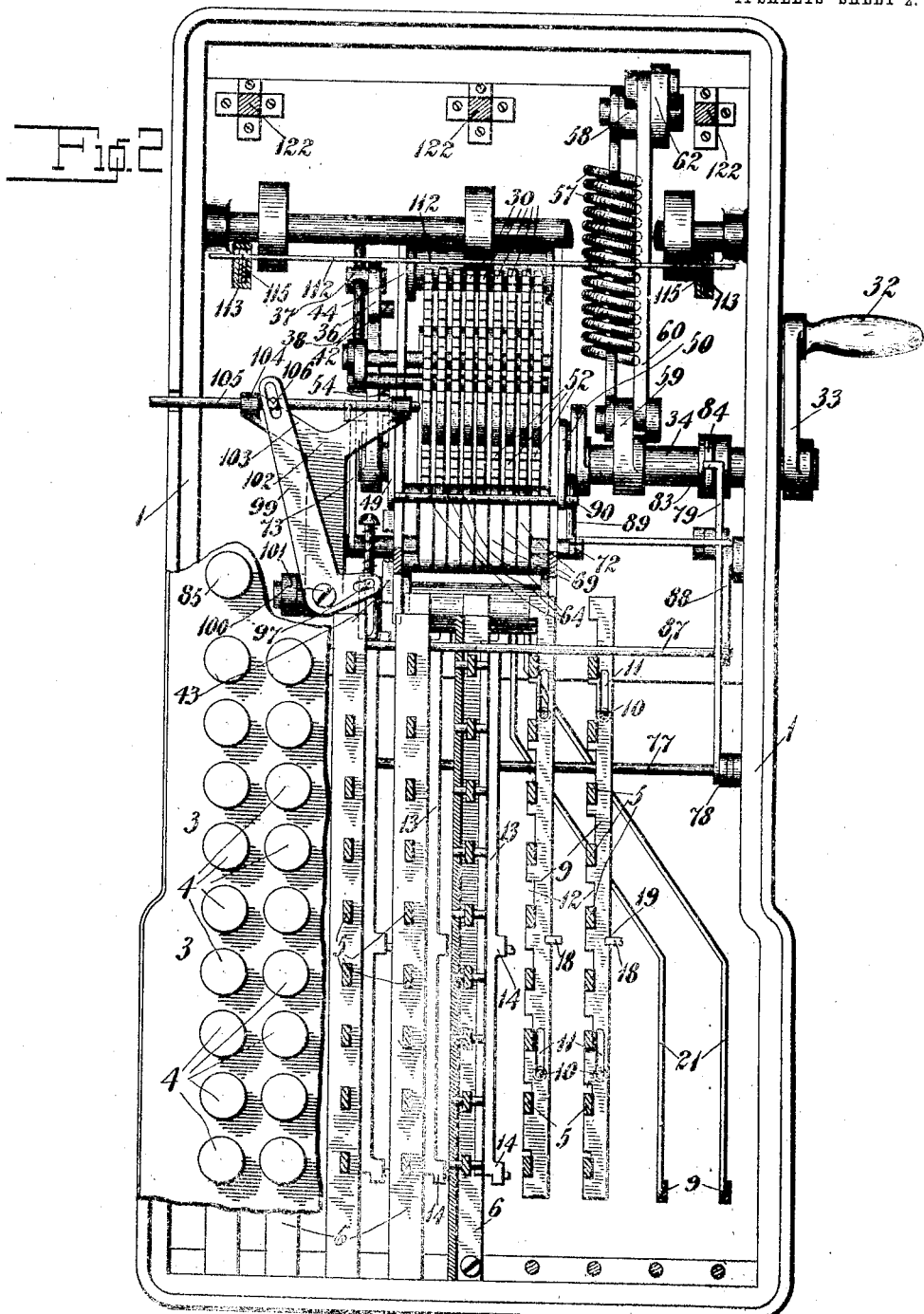

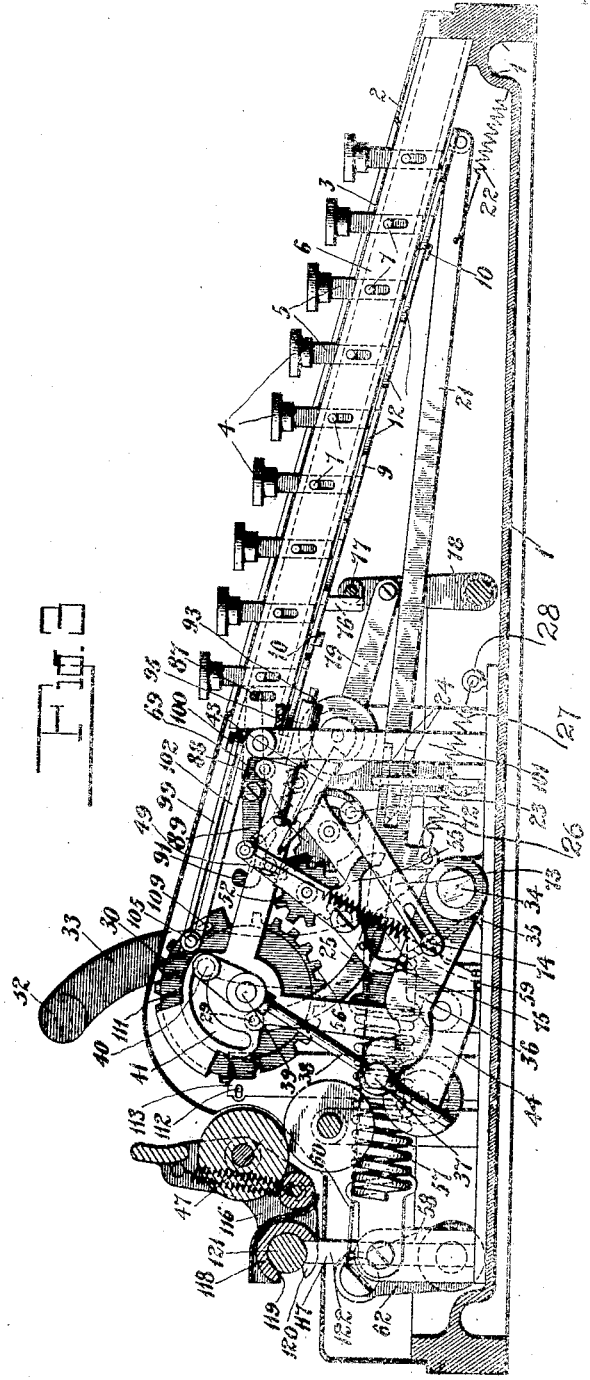

No. 785,097. PATENTED MAR. 21, 1905.
J. R. HAMILTON.
MECHANICAL CALCULATOR.
APPLICATION FILED AUG. 28, 1903.
11 SHEETS—SHEET 4.
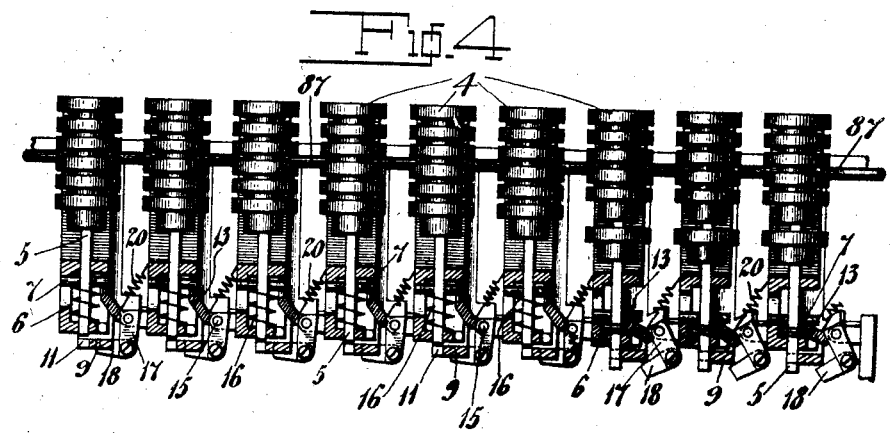
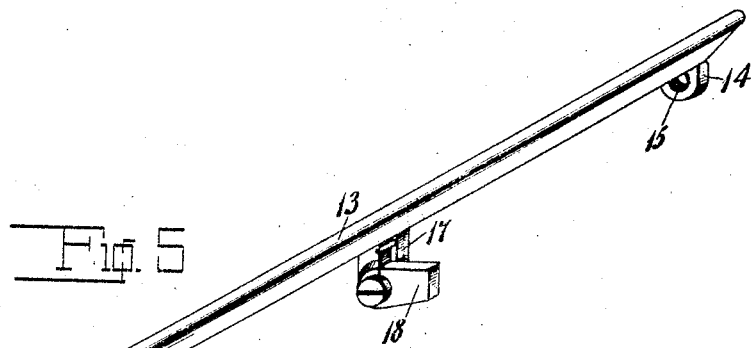
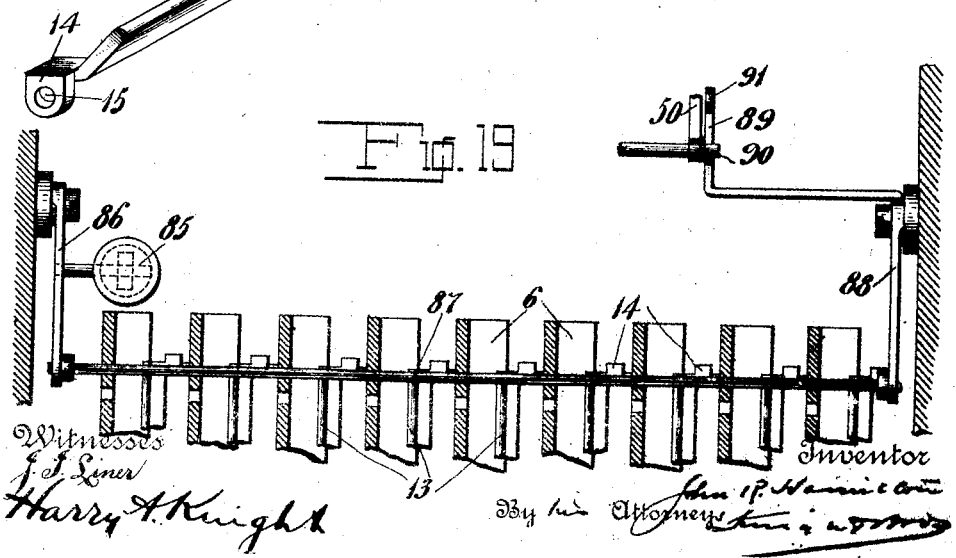

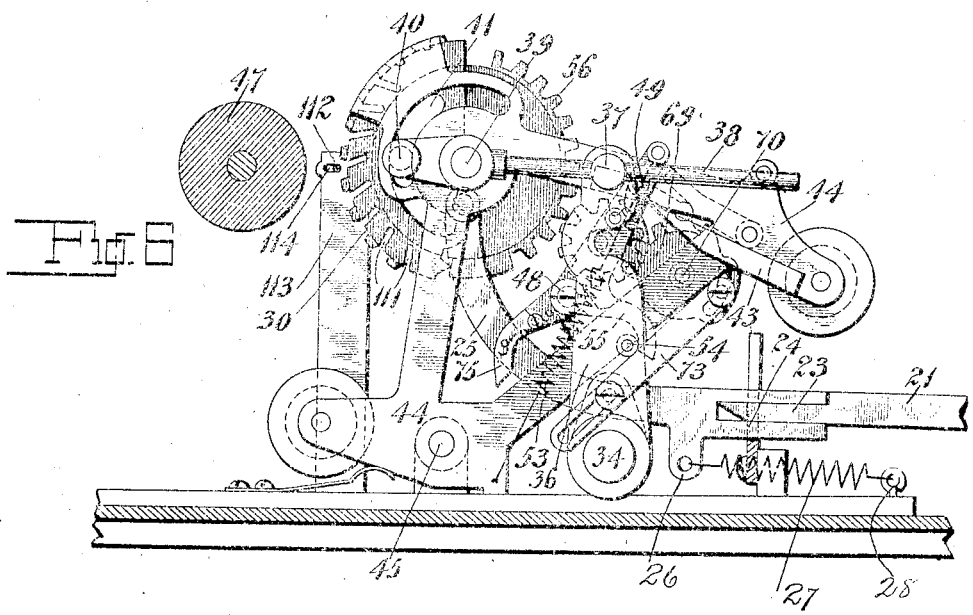

No. 785,097. PATENTED MAR. 21, 1905.
J. R. HAMILTON.
MECHANICAL CALCULATOR.
APPLICATION FILED AUG. 28, 1903.
11 SHEETS—SHEET 6.
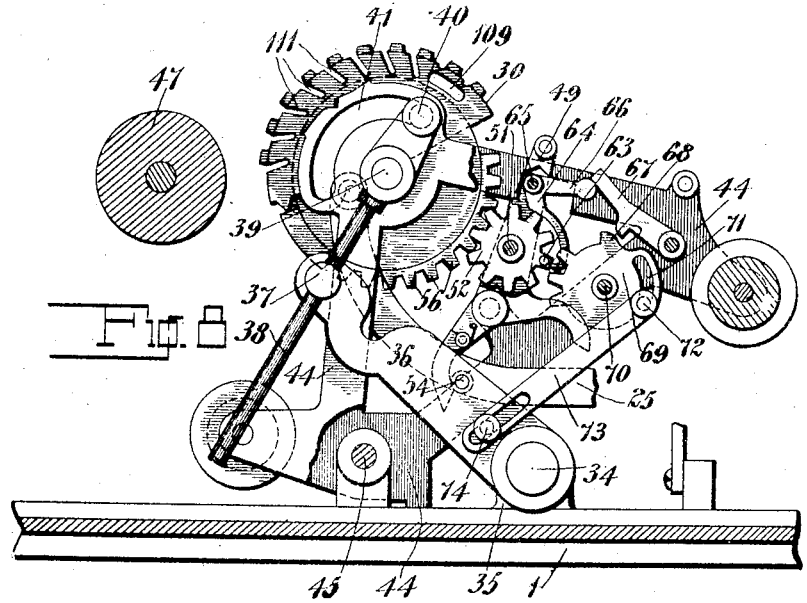
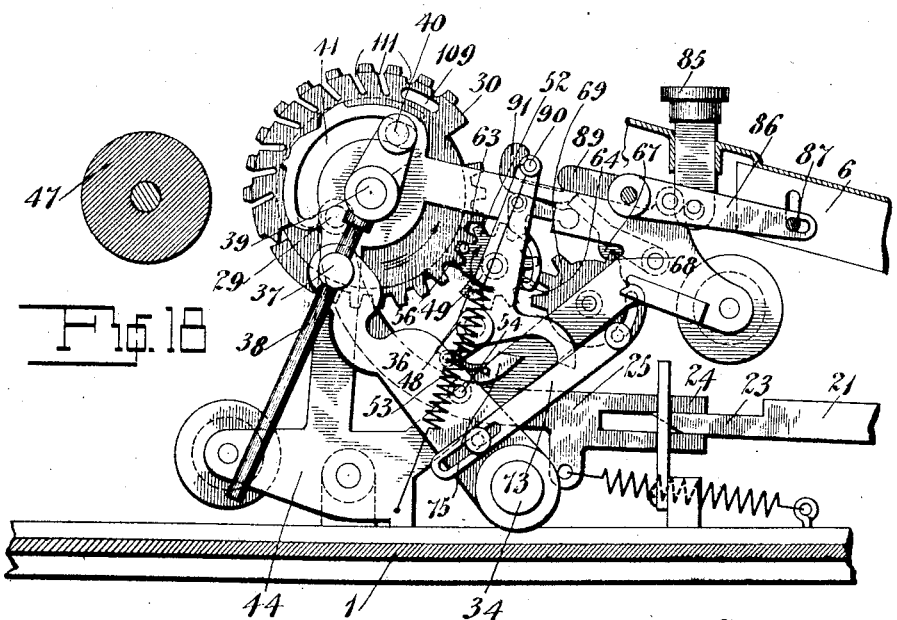
Witnesses
Inventor
John R. Hamilton
By his Attorneys

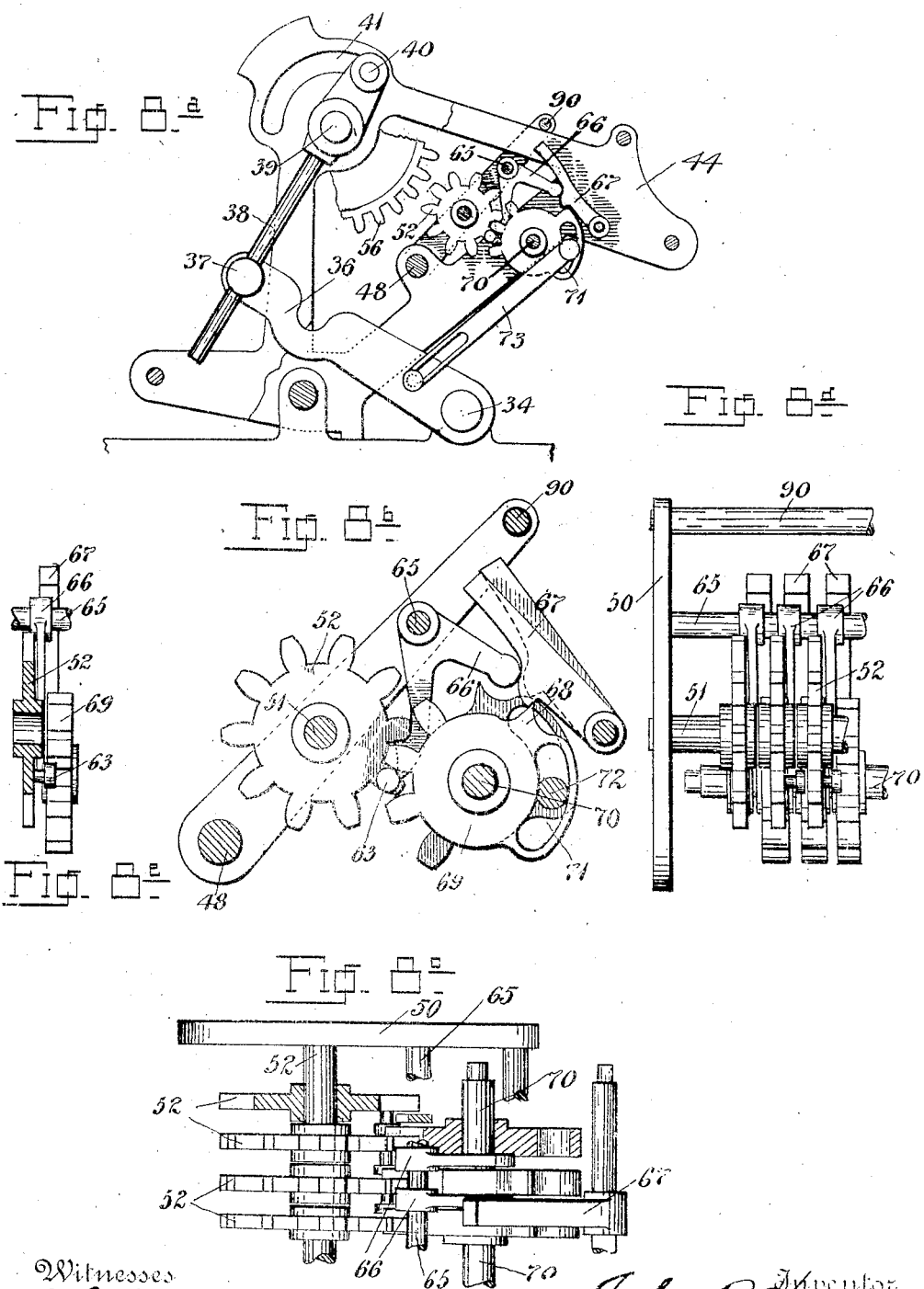

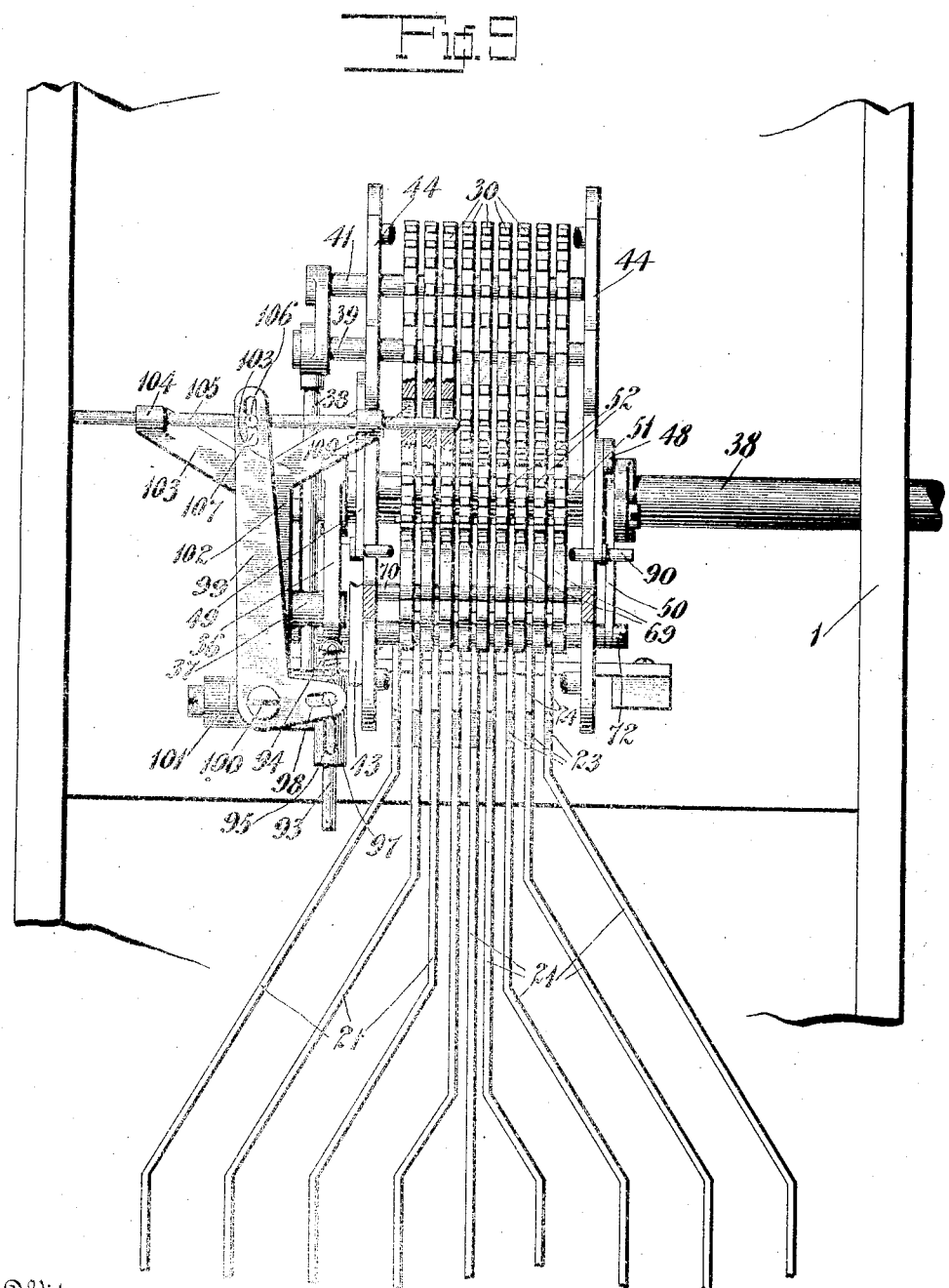

No. 785,097.
PATENTED MAR. 21, 1905.
J. R. HAMILTON.
MECHANICAL CALCULATOR.
APPLICATION FILED AUG. 28, 1903.
11 SHEETS—SHEET 9.
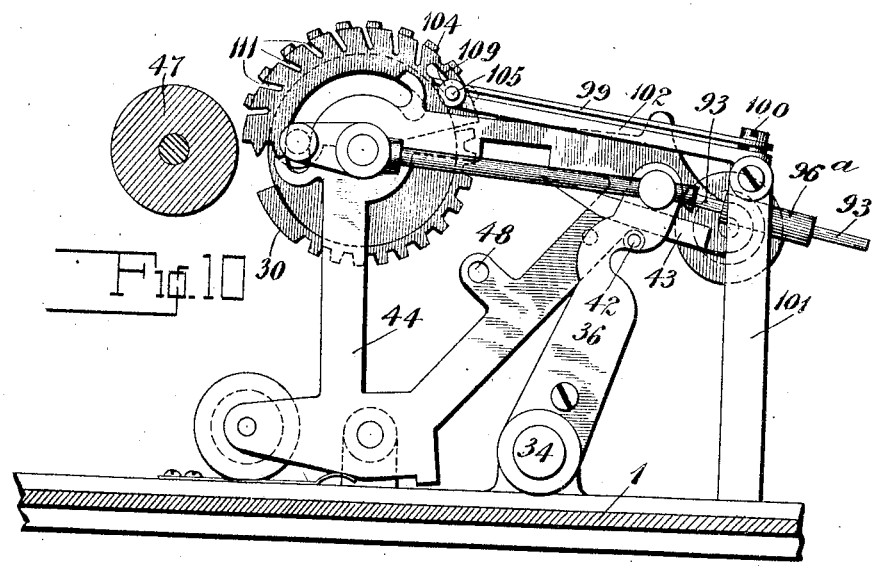
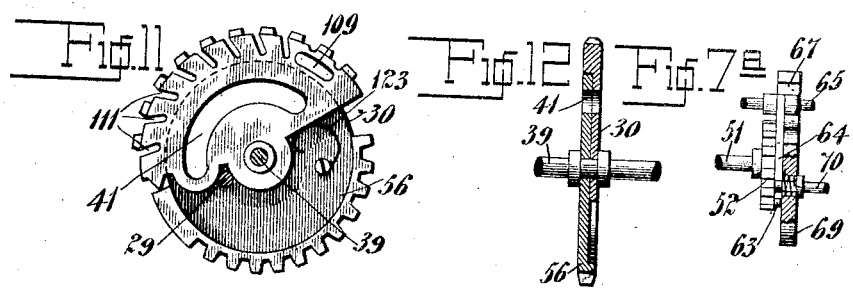
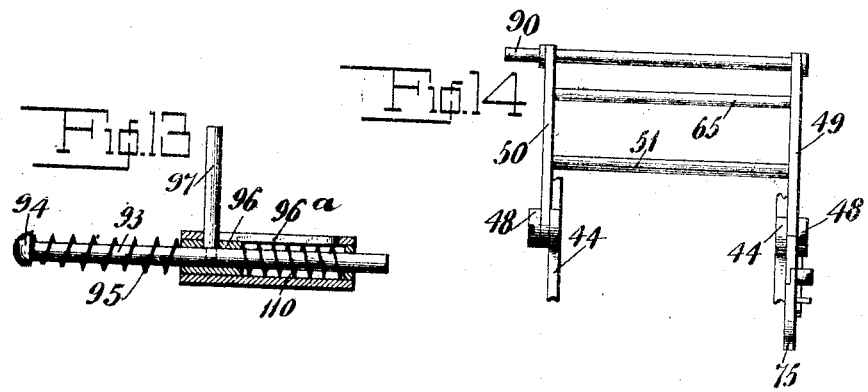
Witnesses
Inventor
John R. Hamilton
By his Attorneys No. 785,097. PATENTED MAR. 21, 1905.
J. R. HAMILTON.
MECHANICAL CALCULATOR.
APPLICATION FILED AUG. 28, 1903.
11 SHEETS—SHEET 10.
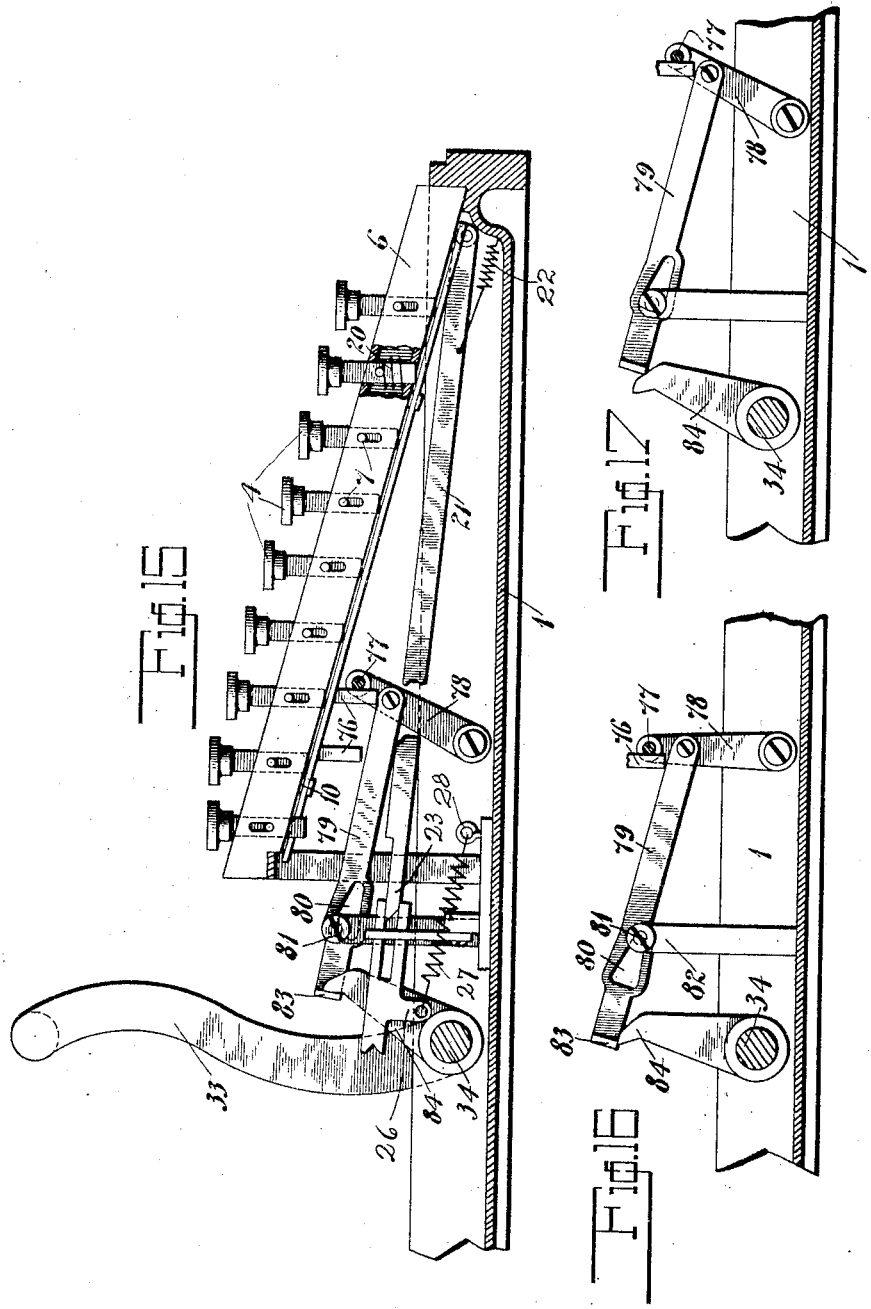

No. 785,097. PATENTED MAR. 21, 1905.
J. R. HAMILTON.
MECHANICAL CALCULATOR.
APPLICATION FILED AUG. 28, 1903.
11 SHEETS—SHEET 11.
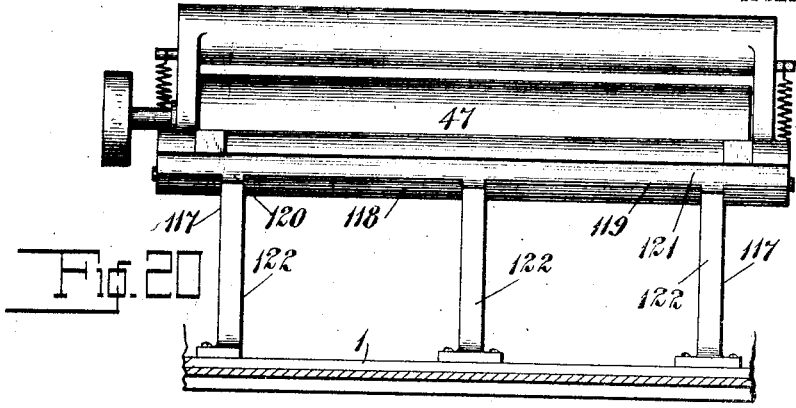
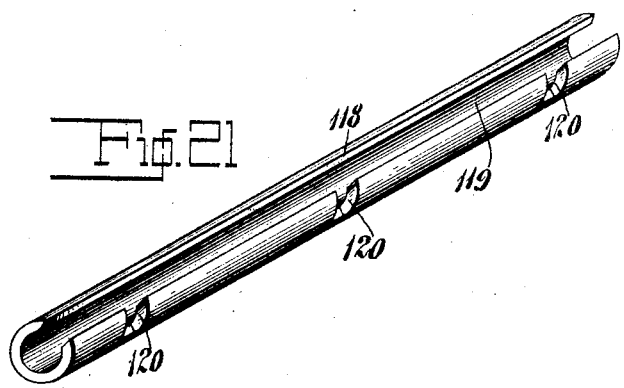
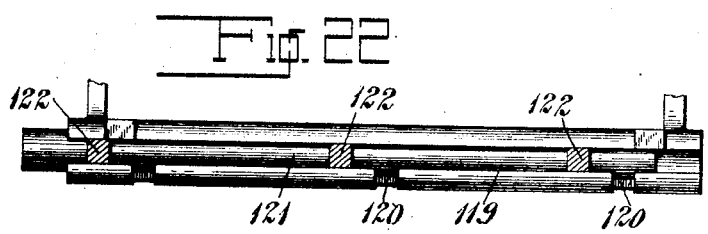
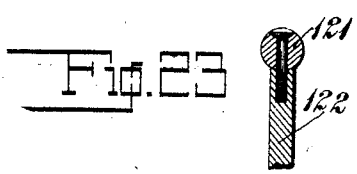
Witnesses
Inventor No. 785,097.

Patented March 21, 1905.

UNITED STATES PATENT OFFICE.

JOHN R. HAMILTON, OF MOUNT KISCO, NEW YORK, ASSIGNOR TO DARIUS P. SACKETT, OF NEW YORK, N. Y.

MECHANICAL CALCULATOR.

SPECIFICATION forming part of Letters Patent No. 785,097, dated March 21, 1905.

Application filed August 28, 1903. Serial No. 171,062.

*To all whom it may concern:*

Be it known that I, JOHN R. HAMILTON, a citizen of the United States, residing at Mount Kisco, in the county of Westchester and State of New York, have invented certain new and useful Improvements in Mechanical Calculators, of which the following is a specification.

My present invention relates to mechanical calculators of that class in which the positions of the recording-wheels just prior to the printing operation are accomplished by suitable actuating mechanism set into operation by the action of a series of keys set by the hand of the operator.

My invention further relates to certain improvements in the means for throwing the recorder-wheels into printing position, in means for carrying, and in means for totaling the sums indicated by the keys, together with means for returning all parts to their normal positions, and, lastly, my invention relates to many improved details of structure clearly hereinafter described, and shown in the accompanying drawings, in which like reference characters refer to like parts, and in which—

Figure 1 is a plan view of a mechanical calculator embodying my invention. Fig. 2 is a sectional plan view of the same. Fig. 3 is a longitudinal sectional elevation of the same. Fig. 4 is a transverse sectional elevation of the keyboard and keys of the machine. Fig. 5 is a detail perspective view of the release-bar. Fig. 6 is a detail sectional elevation showing the position of the recorder-frame just prior to the printing operation. Fig. 7 is a like view during printing operation. Fig. 7ª is a sectional plan view showing the transmitting-wheel, its bell-crank, its adjacent spring-controlled gear, and the latch holding said gear. Fig. 8 is a similar view immediately after the printing operation. Fig. 8ª is an enlarged detail view, partly in section, of the carrying mechanism with parts in normal positions. Fig. 8ᵇ is a similar view, on a larger scale, with parts removed, showing position of parts during a "transfer-upon-a-transfer" operation; Fig. 8ᶜ, a plan view of portion of carrying mechanism, partly in section. Fig. 8ᵈ is a front elevation of the same. Fig. 8ᵉ is a detail rear elevation, partly in section, showing the carrying connections between one of the accumulating-wheels and the gear of next higher denomination. Fig. 9 is a top plan view of the recorder mechanism, showing the recorder-wheel-detaining device. Fig. 10 is a side elevation of a portion of the same, showing a side view of said detaining device. Fig. 11 is a detail view of one of the recorder-wheels. Fig. 12 is a vertical section of the same. Fig. 13 is a detail sectional view of the actuating-pin and its casing of the wheel-detaining device. Fig. 14 is a detail view of the transmitting-pinion frame. Fig. 15 is a detail sectional view showing the slide-bar-return mechanism before the bars have been returned to their normal position. Fig. 16 is a like view showing a portion of said mechanism during the return movement. Fig. 17 is a like view showing position of actuating-arm after same has passed from engagement with the slide-bar-return mechanism. Fig. 18 is a sectional side elevation of the recorder mechanism during the totaling operation. Fig. 19 is a sectional plan view of a portion of the totaling mechanism. Fig. 20 is a rear elevation of the printing-platen carriage. Fig. 21 is a detail perspective of the platen-carriage sleeve. Fig. 22 is a bottom view of the same, showing said sleeve on its track and showing track-standards in section; and Fig. 23 is a detail sectional view of the track and its standards, showing countersunk screws securing same together.

*The type-setting mechanism.*—1 is the casing of my improved calculator having a front 2 with a keyboard 3.

4 represents a series of keys comprising nine rows of nine keys, each having suitable characters on the buttons of said keys corresponding to the type characters on the recorder-wheels. Each of the keys 4 has a stem 5, passing through the keyboard 3, and a channel-iron 6, there being a channel-iron 6 for each of the rows of keys. Each of the stems 5 carries a pin 7 within its channel-iron 6, and extending transversely thereacross and beneath the pin 7 on each stem 5 is a spring 8, bearing at its lower end against the channel-iron 6 and at its upper end against the pin 7.

9 represents a series of slide-bars positioned each below a channel-bar 6 and slidably connected to said bars 6 through means of headed pins 10, seated in bars 6 and engaging slots 11 in bars 9. Bars 9 are provided with a series of graduated notches 12, adapted to engage the lower ends of the stems 5 when the latter are depressed and varying in size according to the number of the key under which they are positioned.

13 is a release-bail pivoted through ears 14 at 15 to lugs 16 on channel-bars 6. The number of release-bails 13 corresponds to the number of rows of keys 4, and each bar 9 is provided, near the center thereof, with depending arms 17, to which is pivoted a spring-pressed dog 18, adapted to engage a suitable notch 19 in the slide-bars 9. Release-bail 13 is adapted to be held in normal position by a spring 20, secured at one end to said bail and at its other end to the next adjacent channel-bar 6. Spring 20 is adapted to hold bail 13 in a position immediately beneath the pins 7 on stems 5, so that when a key 4 is depressed, carrying the pin 7 downwardly, the release-bail 13 will likewise be depressed, disengaging the dog 18 from the notch 19 in the slide-bar 9, so that said bar will be permitted to slide forwardly until arrested by means of the lower end of the stem 5 engaging its corresponding notch 12. Each of the bars 9 is pivotally connected at its forward or lower end with a protractor-bar 21, both of said bars being drawn forward upon release of bar 9 by a spring 22, secured at one end to the forward part of the bar 21 and at its other end to the casing 1 of the machine. Each of the bars 21 is provided at its rear end with a tongue 23, slidably engaging the forked end 24 of one of a series of goosenecks 25. Each of the goosenecks 25 is provided with a depending lug 26, to which is secured at one end a spring 27, secured at its other end to a depending eye-lug 28. Each of the goosenecks 25 is pivotally secured at 29 at its upper end to the upper segment of one of a series of recorder-wheels 30, said segment carrying type 31 on its periphery. When the sliding bar 9 is released, the spring 22 draws the tongue 23 from the forked end 24 of the gooseneck 25 a distance equal to the length of the notch 12, engaging the stem 5 of the particular key 4 depressed, and the spring 27 immediately draws the gooseneck 25 forward until the same is stopped by the tongue 23 again engaging the rear end of the forked end 24. In traveling to such position the gooseneck 25, through its pivotal connection 29, will rotate its particular recorder-wheel 30, when the latter is released in the manner hereinafter described, until the particular type 31 corresponding with the number of the particular key 4 depressed is brought into the proper position for the printing operation.

32 is a handle of crank-arm 33 positioned on the end of shaft 34 without the casing 1. Shaft 34 is journaled in standards 35 on the side of the casing and extends a suitable distance through said casing.

36 is a lever positioned on the inner end of the shaft 34 and connected, through a swivel-joint 37, with crank-arm 38, pivoted on a shaft 39 and carrying at its upper end a horizontal pin 40, extending transversely through a slot 41 in each of the recorder-wheels. When the handle 32 is operated by being brought forward, the lever 36 is raised, drawing crank-arm 38 forward through swivel-joint 37 and carrying the pin 40 through the slots 41 in the recorder-wheels and allowing said wheels to be brought forward by the goosenecks 25 to bring the proper type into printing position, as clearly shown in Fig. 6.

*The printing operation.*—A further forward movement of the handle 32 will draw the lever 36 toward the front of the machine, forcing a suitable friction-roller 42 into engagement with a projecting cheek 43 on the recorder-mechanism frame 44. The frame 44 is pivoted at 45 to lugs 46 and is triangular in shape, supporting at the apex of said triangle the recorder-wheel-carrying shaft 39. As the friction-roller 42 strikes the inclined portion of the projecting cheek 43 it forces said frame rearwardly until the type 31 are brought into printing engagement with the platen 47, in which position the printing operation takes place.

*The carrying mechanism.*—Pivoted at 48 to the frame 44 is a double bell-crank 49, forming one side of the frame 50, as clearly shown in Fig. 14. Frame 50 is provided with a shaft 51, and positioned on shaft 51 are a series of accumulating-wheels 52, one for each of the recorder-wheels 30.

53 is a spring secured at one end to the double bell-crank 49 and at its other end to the frame 44, so that the contractive force of said spring when the bell-crank is in its normal position is forward of the pivotal point 48 of said bell-crank. As the lever 36 ascends, upon the operation of the handle 32, a friction-roller 54 engages the arm 55 of the bell-crank 49, raising said arm and forcing the frame 50 to the rear, bringing the wheels 52 into mesh with the teeth 56 on the lower segments of the wheels 30, in which position the frame 50 is held by reason of the contractive force of the spring 53 being transferred to the rear of the pivotal point 48. At this point in the operation of the machine the handle 32 is released and the frame 44 is returned to its normal position by a motor-spring 57, pivotally secured at one end to a rigid post 58 at the rear of the machine and also pivotally secured at its forward end to an arm 59, rigidly mounted on the shaft 34. In order to limit the forward movement of the handle 32, I provide a metallic strap 60, pivoted at its forward end to the arm 59 and at its rear end to a pivotal arm 62 on the post 58, said strap 60 being adapted at the limit of the forward movement of the handle 32 to strike the shaft 34, thereby preventing further movement of the handle in the forward direction. As the handle 32 is brought forward in opposition to the spring 57 sufficient energy is stored in said spring to upon the release of handle 32 return the frame 44 to its normal position. During such return movement of the frame 44 the lever 36 will return the crank 38 to its normal position, the pin 40 retracing its course through the slots 41 in the recorder-wheels and returning those recorder-wheels to their zero positions which have been moved forward to bring their selected type into position for printing. During such return movement of the recorder-wheels the accumulating-wheels 52, which have up till this time been held in mesh with the teeth 56 on said recorder-wheels 30, will be rotated toward the rear of the machine a number of teeth or notches corresponding to the number of type utilized on its recorder-wheel. As the recorder-wheels 30 reach their zero positions the friction-roller 54 engages the arm 75 of the double bell-crank, and as the arm 36 has a slight movement after the crank-arm 38 has reached its normal position the arm 75 is raised, throwing the double bell-crank toward the front of the machine to throw the accumulating-wheels 52 out of engagement with teeth 56 and into engagement with gears 69. This operation continues, the pin 63 on one of the teeth of each of the accumulating-wheels 52 upon each revolution of its wheel 52 striking the inclined end of a hooked bell-crank 64, pivoted on a shaft 65 on the frame 50, raising said bell-crank 64 and through the upper arm 66 of said bell-crank disengaging a latch 67 from a projection 68 on the gear 69 in line with the next adjacent accumulating-wheel 52 of higher denomination and allowing said gear 69, which is controlled by a suitable spring, (see Fig. 7ª,) to drop a distance equal to one circumferential pitch of the accumulating-wheels, this being practicable because gears 69 are out of mesh with wheels 52, the latter being in mesh with teeth 56. The gears 69 are mounted on a shaft 70, extending transverse the frame. Each of the gears 69 is provided with a segmental slot 71, engaging a pin 72 in a slotted link 73.

74 is a pin seated in the lever 36 and engaging the slot in link 73. Inasmuch as the last part of the return movement of the lever 36 is accomplished after the crank-arm 38 has reached its normal position and inasmuch as the friction-roller 54 at this stage of the return movement of the lever 36 strikes the arm 75 of the double bell-crank 49 to return the accumulating-wheels 52 into mesh with the gears 69 it will be seen that such return of the accumulating-wheels 52 is accomplished after the recorder-wheels have been returned to their zero positions. During this time the pin 74 reaches the lower end of the slot in link 73 and through the link 73 raises the gears 69 which have been lowered until the latch 67 slides over the projection 68 to hold such gears in elevated position. During such upward movement of said gears 69, inasmuch as all of the gears 69 are at this time in mesh with the accumulating-wheels 52, each of those accumulating-wheels 52 which are in line with the gears 69 which have been operated are turned forward to the extent of one circumferential pitch.

From the foregoing it will be seen that when the accumulating-wheel 52 has been rotated a complete revolution by its recorder-wheel—such, for instance, as by the depression of the "6" key succeeding the depression of the "4" key in the units-column—the said wheel 52 will be progressed "ten" teeth or notches. The bell-crank hook 64 in line with the "units" accumulating-wheel being raised and the latch engaged by said bell-crank having been disengaged from the projection 68 on its respective gear 69, the wheel 52 of the next higher denomination—that is, in the "tens" denomination—will be progressed in a manner already described a distance equal to one tooth or notch. Presuming the tens accumulating-wheel 52 to have been in its zero position, the same will be at the end of such operation in its "1" position, while the units accumulating-wheel 52 will have been progressed to its zero position.

In order to provide for a transfer upon a transfer—that is, in the case where two or more of the wheels 52 are in their "9" positions, the pin 63 on each of the wheels 52 is extended into the path of engagement with the teeth on the gear of next higher denomination, the said teeth on the gear 69 being of sufficient width to overlap its wheel 52 and pin 63 of next lower denomination, as clearly shown in Figs. 8ᵈ and 8ᵉ. It will now be presumed that two or more of the wheels 52 are in their "9" positions. One of said wheels of lower denomination is rotated a distance equal to one tooth or notch by its recorder-wheel. The effect of this rotation will be to raise the hooked arm 64 in line with the said wheel 52, releasing the latch 67 and dropping the gear 69 of next higher denomination which was in engagement with the said latch. The next operation occurs at the end of the downward movement of the arm 36, at which time the link 73, through its pin 72, returns gear 69, which has been disengaged from its latch 67 and dropped, to its normal or latched position and rotating the first transmitting-wheel 52 of higher denomination than the wheel 52 initially operated a distance of one tooth or notch, carrying such gear-operated accumulating-wheel of higher denomination to its zero position, and at the same time, by means of its pin 63, moving the next adjacent gear 69 of higher denomination a distance sufficient to move its wheel 52 and a distance equal to one tooth or notch.

The slot 71 in each of gears 69 is of sufficient length to allow for a slight upward movement of gear 69 when said gear is elevated by the pin 63 engaging it.

*The key-returning mechanism.*—When the keys 4 have been depressed so that the lower parts of their stems 5 engage the notches 12 in the slide-bars 9, said keys are held in their depressed position by the friction between the stem 5 and the ends of the notches 12 until the slide-bars 9 are returned to their normal positions, when the keys, being released by their frictional contact, are raised by their springs 8, allowing the release-bail 13 to be drawn upwardly to its normal position by the spring 20, the spring-pressed arms 17 on said release-bail 13 remaining in their lower positions until they register with the notches 19 in said slide-bars, said notches then allowing the arms 17 to be actuated by their springs to raise to their normal position to hold the bars 9 against movement until they are again released by the action of the keys. Each of the slide-bars 9 is provided with a depending projection 76, adapted to be engaged by a transverse bar 77, carried by a pair of arms 78, pivoted to the sides of the machine-casing.

79 is a link pivoted at one end to one of the arms 78 and having a triangular slot 80 adapted to engage a pin 81 on a rigid upright arm 82, secured to the side of the casing. Link 79 is provided with a hooked end 83, adapted to engage a trigger 84, mounted on the shaft 34. Upon the return of the handle 32 to its upright position trigger 84, in engagement with the hooked end 83 of the link 79, is adapted to draw said link and arms 78 forward and through the transverse bar 77 to return the slide-bars 9 through their depending projections 76 to their normal positions. As the link 79 travels forward the pin 81 in engagement with the triangular slot 80 raises said link until the hooked end 83 clears the trigger 84, allowing the handle 32 to be forced back to its normal position.

*The totaling mechanism.*—85 is the totaling-key, connected to a lever 86, pivoted to the side of the casing and extending forwardly of a general release-bail 87, which connects the lever 86 with a rocking lever 88 in the opposite side of the machine. The general release-bail 87 is adapted when the levers 86 and 88 are depressed to depress all of the release-bails 13 to allow all of the slide-bars 9 to be drawn forward to the full extent by the springs 22.

89 is the rearwardly-extending arm of the lever 88 and adapted to engage the under side of an extension 90 on the frame 50, so that upon depressing the lever 88 the arm 89 will be raised, thereby throwing the frame 50 to the rear to throw the wheels 52 into mesh with the teeth 56 upon the recorder-wheels 30. Arm 89 is provided with an upturned end 91, adapted to bear against the extension 90 when the key 85 is released and arm 89 descends to shift the wheels 52 out of mesh with the recorder-wheels 30. In order to reach a total of the sums which have been recorded by the recorder-wheels, the key 85 is depressed, throwing down the general release-bail 87 to release the several slide-bars 9 and to throw the accumulating-wheels 52 into mesh with the recorder-wheels 30. The handle 32 is next drawn forward by the operator, forcing the crank 38 to its lifted position and the pin 40, through the slots 41 in the wheels 30, allowing each of the wheels 30 to rotate in the direction of the arrow, Fig. 18, until the pin 63 on its particular accumulating-wheel 52 rotating in the direction of its arrow is arrested at its zero position by the hooked end of the bell-crank 64, in which position said recorder-wheel will be held against further rotation. Further operation of the handle 32 will force the recorder-wheels into printing operation, as hereinbefore described. If it is desired to return the machine to zero after the totaling operation has been completed, the handle 32 is held in its lower position until after a key 85 has been allowed to ascend, said key being forced up by the springs 20 of the bails 13 through the general release-bail 87. If it is desired to continue the addition of sums to the amount recorded the key 85 is held in its depressed position until after the handle 32 has been raised, so that the return of the several recorder-wheels to their zero positions will return the accumulating-wheels 52 to the advanced positions occupied by them immediately before the totaling operation. Inasmuch as the double bell-crank 49 in the totaling operation is thrown to the rear prior to the operation of the handle 32 the arms 75 will obstruct the friction-roller 54 upon the ascent of the lever 36, so that it is necessary to break said arm 75 by hinging the latter at 92, so that when the friction-roller 54 strikes the said arm 75 the latter will give away to said roller, allowing the same a free path. Suitable spring means may be provided for returning the arm 75 to its extended position.

Inasmuch as the recorder-wheels 30 are normally in position to print zero, I have provided a means for moving the type out of printing position on one or more of said wheels where the number to be recorded comprises less figures than the total number of said recorder-wheels in order that a number will not be preceded by a series of "0's." Such a device comprises a pin 93, having a head 94 adapted to engage the lever 36 in its raised position. Pin 93 passes through a slotted spring-casing 96 and is provided with a collar 96, frictionally held thereon within said casing and having seated in said collar a vertical pin 97, engaging a slot 98 in the bell-crank 99, pivoted on a pin 100, seated in a Y-shaped lever 102, pivoted on the post 101 and having arms 103, providing bearings 104 for a detaining-pin 105. Pin 105 has seated therein a vertical pin 106, engaging a slot 107 in the bell-crank 99.

109 represents a series of elongated perforations in the recorder-wheels 30. As the friction-roller 42 passes under the projecting cheek 43 the end of the lever 36 strikes the head 94 of the pin 93, forcing said pin inwardly in opposition to the spring 110, carrying the collar 96 and the pin 97 toward the front of the machine and operating the bell-crank 99 to force the pin 105 into the perforations 109 until said pin contacts with the first recorder-wheel which has been set. It will be noted that such operation takes place subsequently to the setting of the recorder-wheels to be used in the printing operation. When the pin 105 strikes the face of the first recorder-wheel in the series set pin 106 is brought to a standstill, dogging the movement of bell-crank 99, and consequently the pin 97, and the balance of the stroke of the lever 36 is compensated for by the sliding of the pin 93 through the collar 96 in opposition to the spring 95, which spring 95 is of greater strength than the spring 110 in the casing 96ª.

In order to move the type on the non-selected recorder-wheels which precede the highest unit in the number to be recorded out of printing position through the medium of the detaining-pin 105, I have constructed the recorder-wheels 30 in two overlapping parts adapted to oscillate relatively to each other and said parts comprising an upper segment carrying type and lower segments carrying teeth 56, adapted to engage the transmitting-wheels 49. The upper segment of said wheels 30 is held normally in extended position toward the printing platen at the rear of the machine by spring 123. After the pin 105 has entered the slots 109 upon the engagement of the pin 93 by frame 44 and as a series of recorder-wheels are thrown into printing operation by the recorder-frame the upper segments of the non-significant zero recorder-wheels 30 are drawn backward by pins 105 through the forward movement of frame 44 in opposition to spring 123, thereby drawing the type on the upper segments of the non-significant zero-wheels 30 out of printing position. Such construction of the wheels 30 is necessary inasmuch as when such wheels are in their zero positions backward rotation of said wheels toward the front of the machine would be prevented by the goosenecks 25.

In order to insure correct alinement of the several recorder-wheels during the printing operation, I have provided a series of upwardly curved peripheral slots 111 in the wheels 30 between the type on said wheels and adapted to engage a transverse bar 112 when the wheels are thrown into their printing positions to lock said wheels against movement. Bar 112 is journaled in hollow posts 113, said posts being provided with slots 114 to allow a free movement of the bar 112 therein.

115 represents springs secured at one end to posts 113 and at their other ends to bar 112, said springs 115 being adapted to hold bar 112 in engagement with the slots 111. Slots 111 are curved upwardly, so that upon the return of the several recorder-wheels to their zero positions the bar 112 will leave the said slots readily.

116 is the platen-carriage carrying platen 47. In order to make the carriage 116 easily removable from its supporting-frame 117, I have provided the same with a sleeve 118, having a longitudinal slot 119 therein and notches 120 in one side of said slot. The sleeve 118 is seated on track 121, secured to the standards 122 of the frame 117, said sleeve being seated on the track 121, the slot 119 allowing for the passage of the standards 122 and said sleeve being turned forward, so that the posts 122 engage the notches 120 in sleeve 118 to lock the carriage upon its track.

My invention may be applied equally as well to a registering as to a recording apparatus, although I have described the same in connection with the latter. In the drawings for the sake of clearness some of the parts have been omitted—such, for instance, as the printing-ribbon, in the arrangement of which I claim no invention.

I do not wish to be limited to the exact details of structure herein shown and described, inasmuch as many of the same may be varied without departing from the spirit of my invention.

Having thus described my invention, what I claim as new therein, and desire to secure by Letters Patent, is—

1. In a mechanical calculator of the character described, the combination with a series of adjustably-mounted keys and a series of recorder-wheels, of a series of slide-bars adapted to be engaged and controlled by said keys, and a series of spring-actuated goosenecks connected to and actuating said wheels and having forked ends engaging said bars to control the movement of said goosenecks.

2. In a mechanical calculator of the character described, the combination with a series of adjustably-mounted keys and a series of recorder-wheels, of a series of slide-bars adapted to be engaged and controlled by said keys, of a series of spring-actuated goosenecks connected to and adapted to actuate said recorder-wheels, and having forked ends, and protractor-bars connected at their forward ends to said slide-bars, and adapted to slidably engage at their rear ends the forked ends of said goosenecks to control the movement of the latter.

3. In a mechanical calculator of the character described, the combination with a series of adjustably-mounted keys and a series of recorder-wheels, of a series of spring-actuated slide-bars adapted to be engaged and controlled by said keys, of a series of spring-actuated goosenecks connected to and adapted to actuate said recorder-wheels, and slidable connection between the slide-bars and the goosenecks to control the movement of the latter by the former.

4. In a mechanical calculator of the character described, the combination with a series of adjustably-mounted keys and a series of spring-actuated recorder-wheels, of a series of slide-bars adapted to engage said keys, of suitable connection between the slide-bars and the recorder-wheels to control the movements of said recorder-wheels by the movement of said slide-bars, of a series of dogs engaging said slide-bars, of release-bails adapted to release said dogs, and means carried by said keys to actuate said release-bails, said keys being adapted to control the degree of movement of said slide-bars.

5. In a mechanical calculator of the character described, the combination with a series of recorder-wheels, of a series of channel-bars, of keys mounted in said bars, of a series of slide-bars beneath said channel-bars and having a series of graduated notches therein adapted to engage the stems of said keys, of a suitable connection between said slide-bars and the recorder-wheels to control the movements of the latter by the movements of the former, of a series of spring-controlled dogs engaging said slide-bars, of a series of release-bails adapted to release said dogs from engagement with said slide-bars, of means carried by the stems of said keys adapted to actuate said release-bails, of means for returning the keys to their normal condition, of means for returning the release-bails to their normal positions, and means for returning the slide-bars to their normal positions.

6. In a mechanical calculator of the character described, the combination with a series of keys and a series of recorder-wheels, of a series of slide-bars adapted to be engaged and controlled by said keys, of a series of goosenecks, each pivoted to a recorder-wheel and having forked forward ends, of protractor-bars pivoted to the slide-bars and slidably engaging the forked ends of said goosenecks and means for dogging the slide-bars, means for releasing said dogging means, means for actuating the slide-bars upon release, and means for actuating the goosenecks upon the release of the slide-bars.

7. In a mechanical calculator of the character described, the combination with a series of recorder-wheels, each having a segmental slot therein, of means for determining the extent of forward movement of said wheels, of a bar passing through said segmental slots, of a crank-arm mounted on the axis of said wheels and engaging said bar, of an operating-shaft, of means for operating said shaft, of a swivel connection between said shaft and said crank-arm, and means for throwing said wheels into printing operation.

8. In a mechanical calculator of the character described, the combination with an oscillatory frame and a series of recorder-wheels having segmental slots therein and mounted on said frame, of a spring-controlled gooseneck pivotally secured to each of said recorder-wheels and means for determining the extent of forward movement of said goosenecks, of a bar passing through said segmental slots, of a crank-arm mounted on the axis of said recorder-wheels and secured to said bar, of an operating-shaft, of an arm mounted on said operating-shaft swivelly connected to said crank-arm, of a projecting check carried by said frame, and means carried by said arm adapted to engage said check to force said frame rearwardly to throw the recorder-wheels into printing operation.

9. In a mechanical calculator of the character described, the combination with a series of recorder-wheels and means for determining the extent of forward movement of said wheels, of means for releasing said wheels, of a series of accumulating-wheels, of means for throwing said accumulating-wheels into engagement with said recorder-wheels, means for throwing said recorder-wheels into printing operation, means for returning said recorder-wheels to their normal positions, of a series of normally dogged spring-controlled gears adapted to engage said accumulating-wheels, means carried by said accumulating-wheels for releasing said gears, means for disengaging said accumulating-wheels from the recorder-wheels to throw the former into engagement with said gears, and means for returning said gears to their normal position.

10. In a mechanical calculator of the character described, the combination with a series of recorder-wheels, of a series of spring-actuated goosenecks pivotally connected to said recorder-wheels, of a series of slide-bars, suitable connection between the slide-bars and goosenecks adapted to determine the extent of forward movement of said goosenecks, and a series of keys adapted to engage and determine the extent of movement of said slide-bars, of means for returning the recorder-wheels to their normal positions, accumulating-wheels for registering the extent of such return movement of each of said recorder-wheels and means for transmitting motion from said accumulating-wheels to the next adjacent recorder-wheel of higher denomination.

11. In a mechanical calculator of the character described, the combination with a frame and a series of recorder-wheels carried by said frame, of means for advancing said recorder-wheels to predetermined positions, of a series of accumulating-wheels carried by said frame, means for throwing said accumulating-wheels into engagement with said recorder-wheels while the latter are in their advanced positions, of means for returning said recorder-wheels to their zero positions while in engagement with the said accumulating-wheels, of a series of spring-actuated gears, of means for dogging the said gears, of a series of bell-cranks adapted to disengage said gears, of means carried by each of said accumulating-wheels adapted to actuate a bell-crank to release the next adjacent gear of higher denomination, of means for disengaging the accumulating-wheels from said recorder-wheels and for throwing the same into engagement with said gears, and means for returning said gears to their normal position.

12. In a mechanical calculator of the character described, the combination with an oscillating frame and a series of recorder-wheels carried thereby, of means for advancing said recorder-wheels to predetermined positions, of an operating-shaft, of an arm rigidly mounted on said shaft, of a post rigidly mounted adjacent said shaft, of a motor-spring connecting said post and arm, and suitable connection between said frame and said shaft to move the frame in opposition to said motor-spring to throw said recorder-wheels into printing operation, said spring being adapted to return said frame and recorder-wheels to their normal positions upon release of the operating-shaft.

13. In a mechanical calculator of the character described having a suitable casing, the combination with a suitable frame, a series of recorder-wheels carried by said frame and each having a segmental slot, of means for advancing said recorder-wheels to predetermined positions, of an operating-shaft, of a rigid arm mounted on said shaft, of a post mounted in the said casing, of a motor-spring connecting said post and said arm, of a transverse bar extending through said segmental slots, a crank-arm mounted on the axis of said recorder-wheels and connected to said transverse bar, a second arm mounted on said operating-shaft, a swivel connection between said second arm and said crank-arm, and means carried by said second arm for engaging said frame to first move the latter to the rear to throw said recorder-wheels into printing operation and then to return said frame to its normal position.

14. In a mechanical calculator of the character described, the combination with a series of recorder-wheels, means for advancing said recorder-wheels to predetermined positions, of a series of juxtaposed accumulating-wheels, means for throwing said accumulating-wheels into engagement with said recorder-wheels after the latter have been advanced to their predetermined positions, of a series of juxtaposed gears, means for holding said gears normally in elevated positions, of a series of juxtaposed bell-cranks each having a hooked lower end in the path of the next adjacent accumulating-wheel of lower denomination, said bell-cranks adapted to release said gears, of means for returning said recorder-wheels to zero positions while in engagement with said accumulating-wheels, of pins carried by said accumulating-wheels and adapted to engage and actuate said bell-cranks to release said gears, of means for disengaging the said accumulating-wheels after the return of the recorder-wheels to zero position to throw the former into the line of engagement with said gears, of means for returning said gears to their normally elevated position after said accumulating-wheels have been thrown into the line of engagement therewith, of means for simultaneously advancing said recorder-wheels and throwing said accumulating-wheels into engagement therewith, said pins adapted also to enter the hook on the lower end of said bell-cranks to limit the forward movement of said recorder-wheels, and means for throwing said recorder-wheels into printing operation.

15. In a mechanical calculator of the character described, the combination with an oscillating frame of a series of recorder-wheels of different denominations mounted thereon and having detaining-slots therein, of means for advancing the recorder-wheels of selected denominations to predetermined positions, of means for throwing said selected wheels into printing operation, of a detaining-pin adapted to enter the detaining-slots of the non-selected wheels of higher denomination to move the type on said wheels out of printing position, of a suitable bell-crank engaging said pin, and means for engaging said bell-crank to actuate the latter when the selected wheels are thrown into printing operation.

16. In a mechanical calculator of the character described, the combination with a recorder-wheel comprising two overlapping segments adapted to normally move in unison, of means adapted to engage one of said segments to oscillate said segment relatively to the other and move the type on said recorder-wheel out of printing position.

17. In a mechanical calculator of the character described, the combination with a recorder-wheel comprising relatively movable segments, and spring means causing said segments to normally move in unison, of means operating in opposition to said spring means adapted to move one of said segments independently to move the type portion of the recorder-wheel out of printing operation.

18. In a mechanical calculator of the character described, the combination with the oscillating frame and a series of recorder-wheels rotatably mounted on said frame and provided with segmental slots, of means connected to said recorder-wheels for holding the same in normal position, and for advancing said recorder-wheels to predetermined printing position, a crank-arm mounted on the axis of said recorder-wheels, a transverse bar mounted on said crank and engaging said segmental slot, and means for actuating said crank-arm.

19. In a mechanical calculator of the character described, the combination with the frame and a series of recorder-wheels mounted on said frame, of a series of suitably-mounted accumulating-wheels, a series of suitably-mounted gears, a series of latches holding said gears normally in elevated positions, a series of bell-cranks for releasing said latches and having hooked ends, a series of tripping-pins so mounted on the accumulating-wheels as to trip said bell-cranks upon rotation of the accumulating-wheels in one direction and to be caught in the hooked ends of said bell-cranks upon rotation of accumulating-wheels in the opposite direction, means for moving said accumulating-wheels into and out of mesh with the recorder-wheels and for moving said accumulating-wheels and the tripping-pins into mesh with said gears and means for returning said gears to their latched position while in engagement with said accumulating-wheels.

20. In a calculating-machine of the character described, the combination with a series of recorder-wheels and a series of accumulating-wheels, of a series of actuating-gears in the line of engagement with said accumulating-wheels, a series of latches adapted to hold said gears in elevated positions, a series of latch-releasing bell-cranks, and a series of tripping-pins mounted on said accumulating-wheels, each of said pins extending into the line of engagement with the next adjacent gear of higher denomination and adapted to engage and trip said bell-cranks.

JNO. R. HAMILTON.

Witnesses:
CHAS. R. ROGERS,
HARRY A. KNIGHT.